United States Patent [19]

Ammann et al.

[11] Patent Number: 4,975,869
[45] Date of Patent: Dec. 4, 1990

[54] FAST EMULATOR USING SLOW PROCESSOR

[75] Inventors: Lawrence M. Ammann, Vienna, Va.; Howard C. Jackson, Berthoud, Colo.; Charles D. Johnson; Edward P. Lutter, both of Boulder, Colo.

[73] Assignee: International Business Machines Corporation, Armonk, N.Y.

[21] Appl. No.: 463,835

[22] Filed: Jan. 9, 1990

Related U.S. Application Data

[63] Continuation of Ser. No. 82,602, Aug. 6, 1987, abandoned.

[51] Int. Cl.[5] .............................................. G06F 9/455
[52] U.S. Cl. ............................... 364/900; 364/927.81
[58] Field of Search ................... 364/200 MS, 900 MS; 371/25

[56] References Cited

U.S. PATENT DOCUMENTS

| | | | |
|---|---|---|---|
| 4,025,902 | 5/1977 | Nakao et al. | 364/100 |
| 4,441,154 | 4/1984 | McDonough et al. | 364/200 |
| 4,447,876 | 5/1984 | Moore | 364/200 |
| 4,456,954 | 6/1984 | Bullions, III et al. | 364/200 |
| 4,509,122 | 4/1985 | Agnew et al. | 364/200 |
| 4,611,277 | 9/1986 | Kemppainen et al. | 364/200 |
| 4,638,423 | 1/1987 | Ballard | 364/200 |
| 4,674,089 | 6/1987 | Poret et al. | 371/25 |
| 4,707,803 | 11/1987 | Anthony, Jr. et al. | 364/900 |
| 4,722,047 | 1/1988 | Chan et al. | 364/200 |
| 4,855,905 | 8/1989 | Estrada et al. | 364/200 |

OTHER PUBLICATIONS

IBM System/360 and System/370 I/O Interface Channel to Control Unit Original Equipment Manufacturer's Information, Feb., 1988.

Primary Examiner—Raulfe B. Zache
Attorney, Agent, or Firm—Carl M. Wright

[57] ABSTRACT

Software driven controller emulator includes hardware apparatus for emulating the controller at a speed faster than the software driven emulator, incorporating predicting a next event to be emulated and preactivating dedicated logic to emulate the controller driving the next event. In case of errors, the hardware controller sets a code signal and returns emulation to the software driven emulator for error recovery identified by the code signal.

9 Claims, 6 Drawing Sheets

FIG. 4

| Signal | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| STATE 0 | 1 | 1 | | | | | | | | | | | | | |
| STATE 1 | | | 1 | | | | | | | | | | | | |
| STATE 2 | | | | 1 | 1 | 1 | 1 | 1 | 1 | | | | | | |
| STATE 3 | | | | | | | | | 1 | | | | | | |
| STATE 4 | | | | | | | | | | 1 | 1 | 1 | | | |
| STATE 5 | | | | | | | | | | | | 1 | | | |
| STATE 6 | | | | | | | | | | | | | 1 | 1 | 1 |
| H/W INIT SEL | 0 | | | | | | | | | | | | | | |
| TAGS1 | | 1 | 0 | | | | | | | | | | | | |
| TAGS2 | | | | 1 | 1 | | 1 | | | | | | | | |
| TAGS3 | | | | | | | | | | | | | | 0 | 1 |
| TAGS6 | | | | | | 1 | | | | | | | | | |
| TIMEOUT | | | | 0 | 0 | 0 | 1 | 0 | | | | | 1 | 0 | 0 |
| OPIN | | | | 0 | 0 | | 1 | | | | | | | | |
| STATIN | | | | 1 | 0 | | 0 | | | | | | | | |
| SELIN | | | | 0 | 1 | | 0 | | | | | | | | |
| ADRIN | | | | | | | | | | | | | | | 1 |
| PARITY | | | | | | | | | | 0 | 1 | 1 | | | |
| BUSIN=ADR REG | | | | | | | | | | | 0 | 1 | | | |
| SELECT STATE 0 | X | | | | | | | | | | | | | | |
| SELECT STATE 1 | | X | | | | | | | | | | | | | |
| SELECT STATE 2 | | | | | | | | | X | | | | | | |
| SELECT STATE 3 | | | X | | | | | | | | | | | | |
| SELECT STATE 4 | | | | | | | | | | | | | | | X |
| SELECT STATE 5 | | | X | | | | | | | | | | | | |
| SELECT STATE 6 | | | | | | | | | X | | | | | | |
| SELECT STATE 7 | | | | X | X | X | X | | X | X | X | X | X | X | |
| SET CODE A | | | | | | | | | X | | | | | | |
| SET CODE B | | | | | | | | | | X | | | | | |
| SET CODE 1 | | | | X | | | | | | | | | | | |
| SET CODE 2 | | | | X | | | | | | | | | | | |
| SET CODE 8 | | | | | X | | | | | | | | X | X | |
| SET CODE 9 | | | | | | X | | | | | | | X | | |
| ADR REG TO BUSOUT | | X | | X | X | | | | X | | | | | | |
| SET ADROUT TAG | | | | X | | | | | | | | | | | |
| RESET ADROUT TAG | | | | | | | | | X | | | | | | |
| SET HOLDOUT TAG | | | | | X | | | | | | | | | | |
| SET SELOUT | | | | | X | | | | | | | | | | |
| RESET SUPROUT TAG | | | | | | | | | X | | | | | | |
| SET END-OF-OP | | | | | X | X | X | X | | X | X | | X | X | X |
| START PART 2 | | | | | | | | | | | | X | | | |

FIG. 5

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| STATE 0 | 1 | | | | | | | | | | | | | | | |
| STATE 1 | | 1 | 1 | 1 | 1 | | | | | | | | | | | |
| STATE 2 | | | | | | 1 | 1 | 1 | 1 | | | | | | | |
| STATE 3 | | | | | | | | | | 1 | 1 | 1 | 1 | | | |
| STATE 4 | | | | | | | | | | | | | | 1 | | |
| STATE 6 | | | | | | | | | | | | | | | 1 | 1 | 1 | 1 |
| H/W INIT SEL | 0 | | | | | | | | | | | | | | | |
| START PART 2 | | 1 | | | | | | | | | | | | | | |
| TAGS4 | | | 1 | | 0 | | | | | | | | | | | |
| TAGS5 | | | | | | | | | | 1 | | 0 | | 0 | | 1 |
| ADRIN | | | | 0 | | | | | | | | | | | | |
| STATIN | | | | | | | | | | 1 | | | | | 0 | 0 |
| PARITY | | | | | | 1 | 0 | 1 | 1 | | | | | | | |
| BUSIN=0 | | | | | | | 0 | 1 | 1 | | | | | | | |
| CMD=0 | | | | | | | 0 | 1 | | | | | | 0 | 0 | 1 |
| TIMEOUT | | | | 0 | | 0 | | | | 0 | | 0 | | 0 | 1 | 0 | 0 |
| TIMEOUT ERROR | | | | | 1 | | | | | | | 1 | | | | |
| SELECT STATE 0 | X | | | | | | | | | | | | | | | |
| SELECT STATE 1 | | X | | | | | | | | | | | | | | |
| SELECT STATE 2 | | | | | | | | | | X | | | | | | |
| SELECT STATE 3 | | | | X | | | | | | | | | | | | |
| SELECT STATE 4 | | | | | | | X | | | | | | | | | |
| SELECT STATE 6 | | | | | | X | | | | | | X | | | | |
| SELECT STATE 7 | | | X | | X | X | | | | X | X | | X | X | X | X |
| GATE CMD TO DEVICE | X | X | | | | | | | | | | | | | | |
| SET CMD OUT TAG | | X | | | | | | | | | | | | | | |
| RESET CMD OUT TAG | | | | | | | | | X | | | | | | | |
| SET END-OF-OP | | | X | X | X | X | | | | X | X | | X | X | | X |
| SET CODE 0 | | | | | X | | | | | | | | | | | |
| SET CODE 3 | | | | | X | | | | | | | | | | | |
| SET CODE 8 | | | | X | | | | | | | X | | X | | | |
| SET CODE 9 | | | X | | | | | | | X | | X | | | | |
| SET SERV OUT TAG | | | | | | | X | | | | | X | | | | |
| SET HOLD OUT TAG | | | | | | | | X | | | | | | | | |
| SET SELECT OUT TAG | | | | | | | | X | | | | | | | | |
| START | | | | | | | | | | | | | | | X | |

FAST EMULATOR USING SLOW PROCESSOR

BACKGROUND OF THE INVENTION

1. Field of the Invention

This invention relates to digital controller emulators and particularly to emulators coupled to slow processors to emulate a faster controller.

Peripheral devices coupled to channels of a fast host controller are called channel driven devices as contrasted with devices driven by serial or parallel interface drivers. There are many advantages to the channel driven procedure, the most important being speed and less host interventions, freeing the host to perform other tasks.

When a limited amount of host processing is required to drive a device, it is more economical to use a lower priced processor for the host. For example, personal computers can usually handle the amount of processing needed to control a single device but the small processors do not operate at the high speeds required to service channel driven devices.

2. Description of Related Art

Emulators are known in the prior art but are usually slower than the target controllers, i.e., the controllers or processors they emulate. They are commonly employed to produce the output equivalent of the target controller or processor but at a slower speed.

U.S. Pat. No. 4,447,867 discloses an emulator control sequencer synchronized to the fetch-execute cycles of a microprocessor. It monitors the data bus and certain status lines while the microprocessor is running to predict when operation codes will be fetched and to inhibit certain cycles while supplying miscellaneous control and status signals to emulate the execution of an operation.

In U.S. Pat. No. 4,441,154, a microprocessor is provided with an emulator mode so that it can be combined with external devices to emulate a composite system for software development.

The teachings of the patents, like other prior art emulators, are directed to supplying signals that would be generated by operations that are not part of the processor and do not operate faster than the target processor.

While useful for extending the functional capabilities of processors with limited instruction sets, the prior art emulators fail to provide the speed of execution and response of the target processor while operating under the control of a slower processor.

SUMMARY OF THE INVENTION

Providing the requisite speed while using a relatively slow processor is accomplished in the invention by coupling the slow processor to the driven device using an emulator. An emulator according to the invention can transfer data at the rate of 3.7 megabytes per second in 32,768 byte bursts. Software control (from the slow host processor) is provided for each tag change. The emulator provides automatic initial selection, automatic data transfer, tag sequence validity checks, parity checks, and bad device status checks among other things. The disclosed arrangement can emulate byte multiplexers, block multiplexers, and selector channels while operating in a d-c interlocked mode, a high speed interlock mode, or a data streaming mode.

Major components of an emulator according to the invention include dedicated timing devices, high speed logic modules, and a state machine controller. The state machine described herein comprises three sequential machines that predict events on the channel being emulated and preactivate the logic modules for immediate response when the event occurs. The responses can thereby occur faster than the software emulator of the host processor can operate.

In accordance with the invention, an apparatus for emulating the control procedures of a target device, where the procedures are a sequence of events, incorporate a software programmed controller and hardware. The hardware emulates at least one procedure of the target device using a means that predicts the next event and preactivates a dedicated logic circuit that controls the next event. The programmed controller activates the hardware controller to emulate certain procedures, especially those which operate faster than the program controller can react.

BRIEF DESCRIPTION OF THE DRAWING

The invention is described in detail by referring to the various figures which illustrate specific embodiments of the invention, and wherein like numerals refer to like elements.

FIG. 4 is a state flow diagram of a sequential state machine for performing the first part of the initial selection procedure of the emulator.

FIG. 5 is a state flow diagram of a sequential state machine for performing the second part of the initial selection procedure of the emulator.

DESCRIPTION OF THE PREFERRED EMBODIMENT

Figure 1:
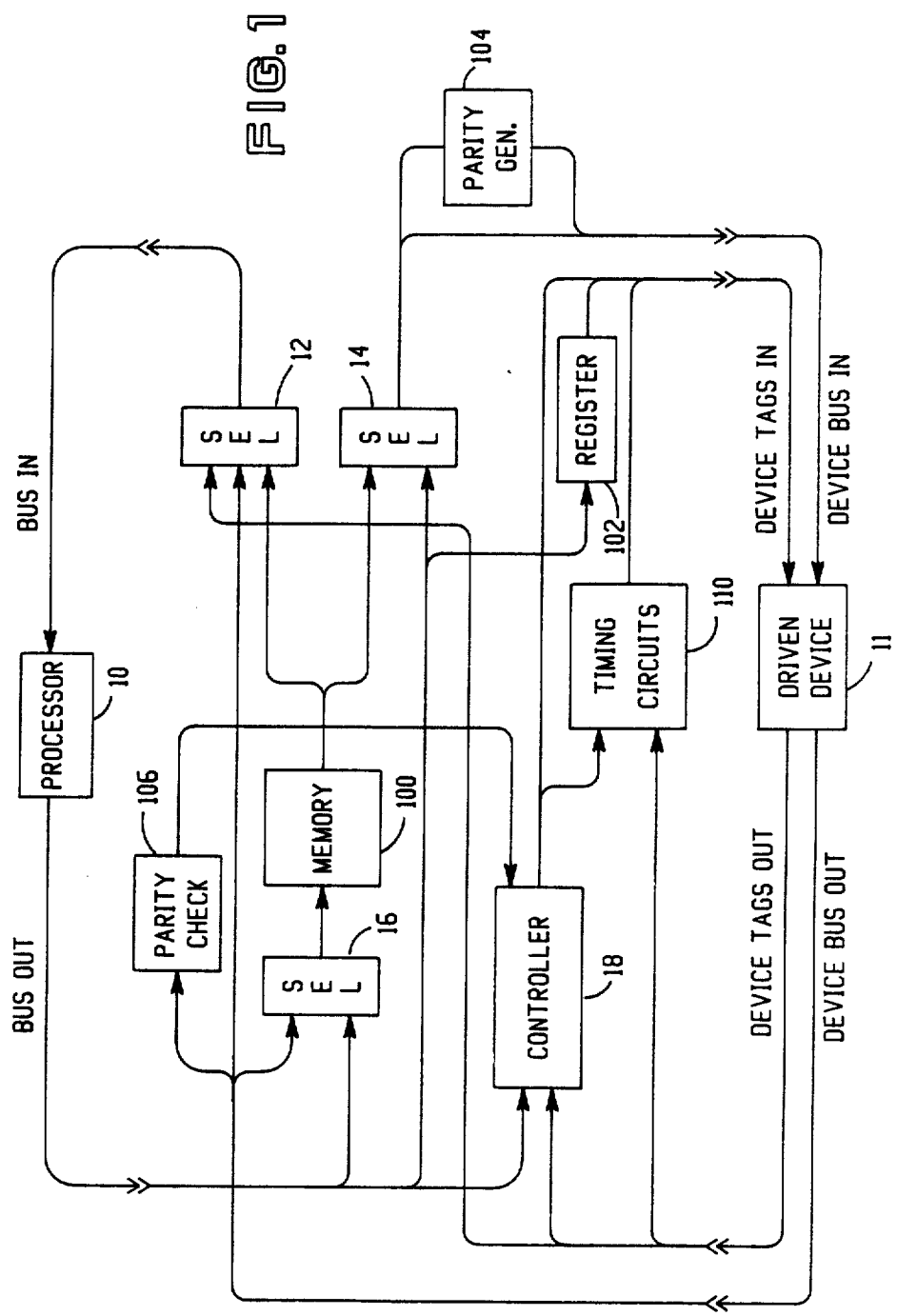
FIG. 1 is a block diagram of an emulator according to the invention coupled between a processor and a driven device.

The details of the system emulated by the preferred embodiment are described in "IBM SYSTEM/360 AND SYSTEM/370 I/O INTERFACE CHANNEL TO CONTROL UNIT ORIGINAL EQUIPMENT MANUFACTURERS' INFORMATION", IBM Order No. GA22-6974 (hereinafter OEMI). The channel operations include several principal procedures including initial selection and date transfer. The data transfer procedure requires the fastest speed. The initial selection procedure also should be performed at fast speed. For some devices, the initial selection and data transfer procedures must be performed at high speed. The other procedures, such as the ending sequence procedure, can be performed at slower speeds.

All procedures may be performed by software routines executed by the processor, but at a slower speed which degrades performance of a driven device.

The output lines from a S/370 I/O (input/output) channel comprise tags and bus lines. The tag lines are essentially for control signals and the bus lines for data signals. One of three channels—selector, byte or block—is identified by certain tag sequences. One of three modes is selected by tag manipulations—d-c interlock, data streaming, or high-speed interlock. The details of such tag use is set forth in the OEMI.

The emulator according to the invention is designed to emulate a System/370 I/O channel where all procedures can be executed by software in a small processor, such as a personal computer. Hardware implementation of the initial selection procedure and the data transfer procedure is provided to execute these two procedures faster than the processor can.

In the preferred embodiment, three sequential state machines are employed, two for controlling the initial selection and one for controlling the data transfer procedure. The initial selection procedure is divided into two parts to simplify the hardware requirements.

To make the hardware respond as fast as possible, it is made predictive. That is, based on the sequence of past events, the state machines predict the next event and preactivate the proper logic modules that supply the responses corresponding to the event predicted. This arrangement according to the invention provides the capability of rapid response.

In case of errors, control returns to the software emulation. The errors can be the result of an incorrect prediction of the next event, an abnormal condition on the interface, or a normal condition the hardware is not designed to handle. Recovery from errors encountered by the hardware is accomplished by returning control to the software. In doing so, the hardware provides code signals used by the software to determine the reason for hardware termination.

The principal signals used in the detailed description of the invention, with their corresponding abbreviations, are listed below.

S/370 Bus In . . . BUSIN
S/370 Status In . . . STATIN
S/370 Request In . . . REQIN
S/370 Service In . . . SERVIN
S/370 Data In. . . DATIN
S/370 Operational In . . . OPIN
S/370 Disconnect In . . . DISCIN
S/370 Select In . . . SELIN
S/370 Address In . . . ADRIN
S/370 Mark 0 In . . . MKOIN
S/370 Bus Out . . . BUSOUT
S/370 Address Out . . . ADROUT
S/370 Command Out . . . CMDOUT
S/370 Service Out . . . SERVOUT
S/370 Data Out . . . DATOUT
S/370 Operational Out . . . OPOUT
S/370 Hold Out . . . HOLDOUT
S/370 Select Out . . . SELOUT
S/370 Suppress Out . . . SUPROUT Not all of the above signals are used in the hardware state machines, but they are used in the software emulator.

Some of the above signals are used in combination for controlling the state machines The combinations are called tags and are generated as follows.

TAGS1=OPIN' & STATIN' & SERVIN' & DATIN' & DISCIN' & ADRIN' & SELIN' & MKOIN'

TAGS2=SERVIN' & DATIN' & DISCIN' & ADRIN' & MKOIN'

TAGS3=OPIN & STATIN' & SERVIN' & DATIN' & DISCIN' & SELIN' & MKOIN'

TAGS4=OPIN & STATIN' & SERVIN' & DATIN' & DISCIN' & SELIN'

TAGS5=OPIN & SERVIN' & DATIN' & DISCIN' & ADRIN' & SELIN'

TAGS6=(OPIN & STATIN) v (OPIN & SELIN) v (STATIN & SELIN) v TAGSA' v ADRIN

TAGSA=SERVIN' & DATIN' & DISCIN' & MKOIN'

TAGSB=OPIN & SERVIN' & DATIN' & DISCIN' & SELIN'

(In the above generation of the tags output signals, the symbol & represents the logical AND operation; v, the logical OR; and ', the logical NOT or inverse operation.)

In FIG. 1, a block diagram of the emulator is shown coupling a processor 10 to a driven device 11 The processor 10 has an input bus and an output bus. The driven device 11 has an input bus and an output bus (DEVICE BUS IN and DEVICE BUS OUT) and a tag in line and a tag out line (DEVICE TAGS IN and DEVICE TAGS OUT). In the illustrative example, the driven device 11 can be a printer and the bus lines carry data for printing and the tag lines carry control signals in and out of the driven device 11.

The BUS OUT signals from the processor 10 are coupled to a selector 16, a selector 14, a register 102, and a controller 18. In the preferred embodiment, the controller 18 contains state machines as described in more detail below.

The selector control lines are not shown in the interest of clarity; they originate from the controller 18 or the timing circuits 110 and are coupled to the selectors to control which input line is coupled to the output line of each selector during any specific timing signal The output signals from the processor 10, comprising either data or commands, can be stored in a memory 100 through the selector 16, routed to the input bus of the driven device 11 through the selector 14, stored in the register 102 to be routed to the tag input of the driven device 11, or to the controller 18 to provide input signals to the state machines.

The input bus to the processor 10 is coupled to one of three sources by the selector 12. The sources are the output signals from the memory 100, the output bus or the output tags from the driven device 11.

The selector 14 directs the output signals from the memory 100 as well the aforementioned output bus from the processor 10 to the input bus of the driven device 11. A parity generator 104 is supplied to generate proper parity for the signals to the input bus of the driven device.

The data on the output bus from the driven device 11 can be stored in the memory 100 through the selector 16. A parity checker 106 tests the parity of the output data from the driven device 11 to insure data integrity. Any error in parity is transmitted to the controller 18.

The tag output signals from the driven device 11, in addition to being coupled to the processor 10 through the selector 12, are coupled to the controller 18 and timing circuits 110.

The interconnections just described permit great flexibility in supplying commands and interchanging data between the processor 10 and the driven device 11. The arrangement described permits a slow processor 10 to control a driven device which operates much faster than the processor. In effect, the emulator of FIG. 1 appears to the driven device 11 to be a faster emulated host processor than the processor 10 is capable of emulating by software alone.

Data to be supplied to the input bus of the driven device 11 can be stored in the memory 100 at a relatively slow speed and read out to supply the input bus of the driven device 11 at a faster speed. Some commands can be supplied to the input bus of the driven device 11 from the processor 10 through the intermediate storage register 102 for proper timing.

There are, however, circumstances in which the driven device 11 issues tag output data and a response thereto, including input tag data, is required faster than the processor 10 can supply it. To supply a response to tag out data from the driven device 11 at a speed commensurate with the speed of the driven device, which is faster than the response time of the processor 10, the controller 18 is constructed to predict from past events which event is to occur next and to preactivate the timing circuits 110 to respond to the output tag data from the driven device 11.

The timing circuits 110 comprise several logic (or timing) modules, one for each tag or bus line requiring a fast response. An example of one such logic (timing) module is illustrated in FIG. 2.

Figure 2:
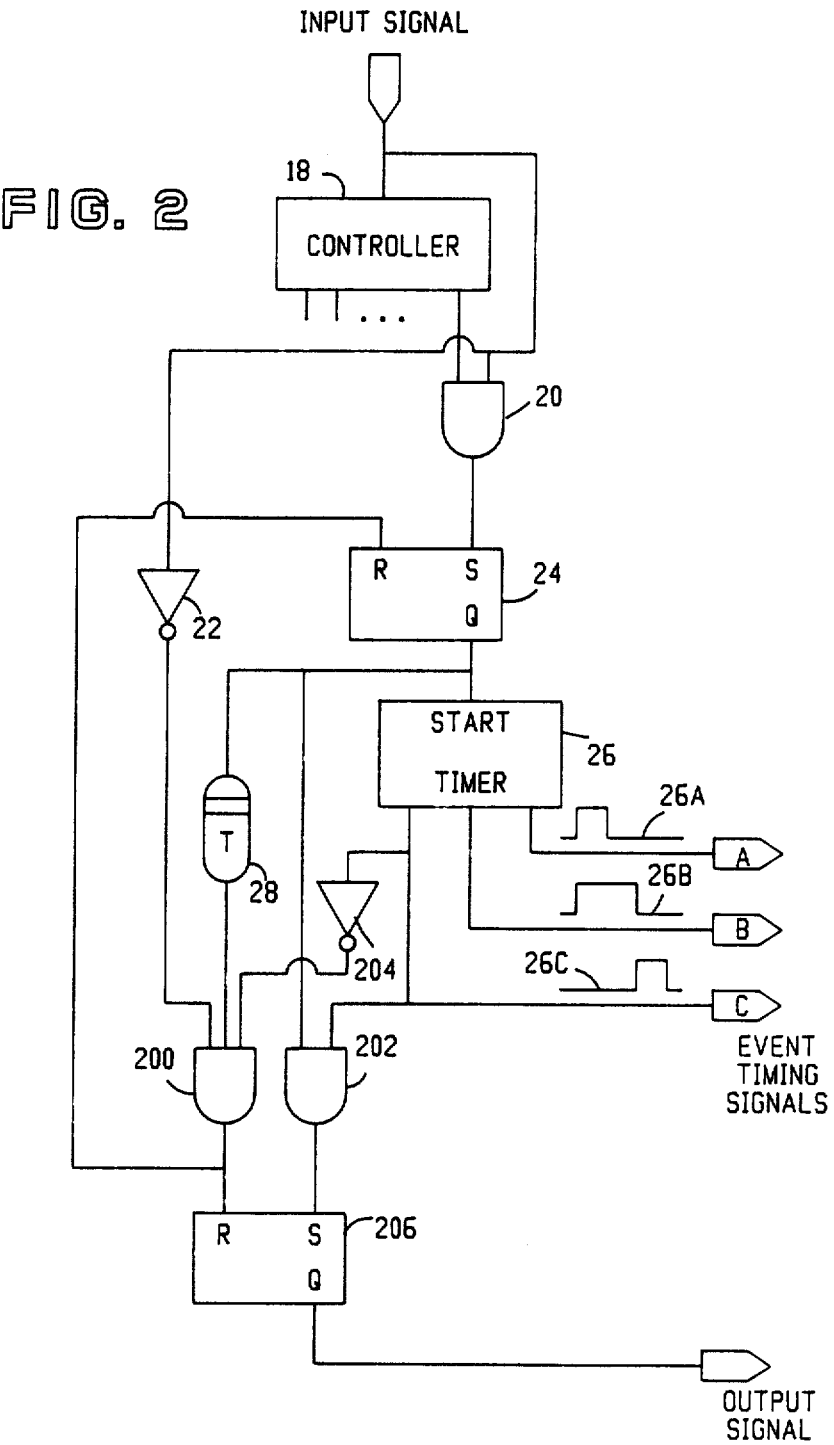
FIG. 2 is a logic diagram of an example of a timing module.

The logic module shown in FIG. 2 is described in terms of its operation for controlling a DATA IN TAG which is to read a byte of data from the memory 100 (FIG. 1), to decrement the byte count (the number of bytes to be transmitted to the driven device as supplied by a channel control word), and to increment the memory address (in the memory 100) to address the next byte to be accessed, and supply a DATA OUT TAG to the driven device to indicate the data is available.

Figure 3:
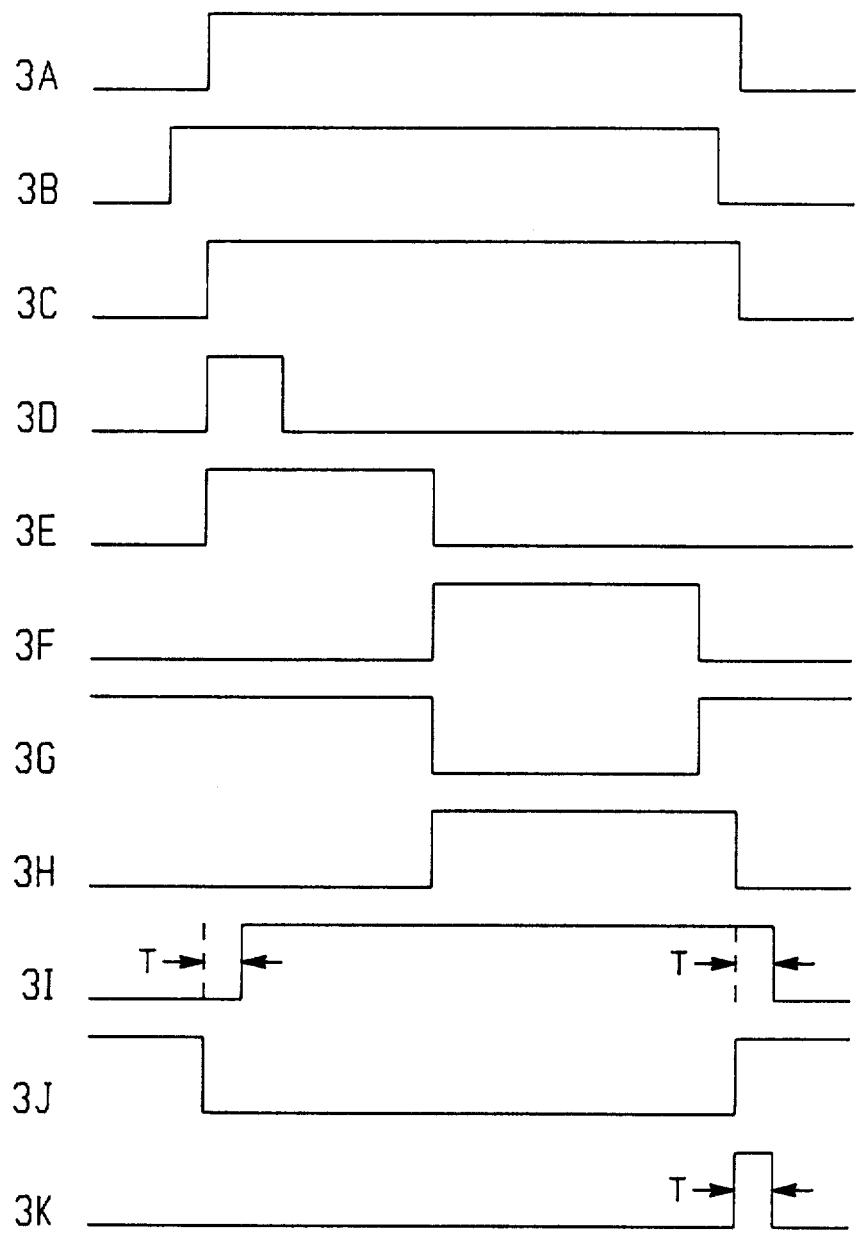
FIG. 3 is a timing diagram of the operation of the logic module of FIG. 2.

The details of the operation of the logic module of FIG. 2 will be explained with reference to the timing diagram of FIG. 3.

The input signal (FIG. 3A), viz., a DATA IN TAG, is supplied to the controller 18, to an input terminal of an AND gate 20, and to the input terminal of an inverter 22. The other input signal to the AND gate 20 (FIG. 3B) was applied before the input signal as a result of the prediction by the controller 18.

The input signal is also supplied to the controller 18 which will then prepare to activate the next logic module in the timing circuits, including possibly the same one as presently activated. If the input signal to the controller 18 is not the expected one, then the controller 18 will set a corresponding code and return emulation to the processor 10 software emulation with some degradation in throughput.

The output signal from the AND gate 20 sets a flip-flop 24. The set, or Q, output signal from the flip-flop 24 (FIG. 3C) is applied through a delay circuit 28 to an AND gate 200 and directly to an AND gate 202. It also starts a timer 26 which provides three sequential output signals 26A, 26B, and 26C, collectively referred to as event timing signals, on output terminals A, B, and C, respectively. The signal 26A, for example, decrements the byte count. The signal 26B strobes the memory 100 (FIG. 1) to read out the byte at the current address (not shown). The signal 26C increments the memory address. The event timing signals 26A, 26B, and 26C are shown in FIG. 3 as FIG. 3D, FIG. 3E, and FIG. 3F, respectively.

The output signal, viz., DATA OUT TAG, is supplied from a flip-flop 206 and is shown as FIG. 3H. The flip-flop 206 is set by an output signal from the AND gate 202 which corresponds to the event timing signal 26C (FIG. 3F) since the other input signal to the AND gate 202 is already supplied by the output signal from the flip-flop 24 (FIG. 3C).

The inverted event timing signal 26C at the output terminal of the inverter 204 (FIG. 3G) and the inverted input signal from the output terminal of the inverter 22 (FIG. 3J), together with the delayed set output signal from the flip-flop 24 (FIG. 3I), activate the AND gate 200 (FIG. 3K) to reset the flip-flops 24 and 206. (The delay 28 is supplied to insure that the reset signal (FIG. 3K) to the flip-flops has sufficient pulse width to reset the flip-flops properly.)

Figure 6:
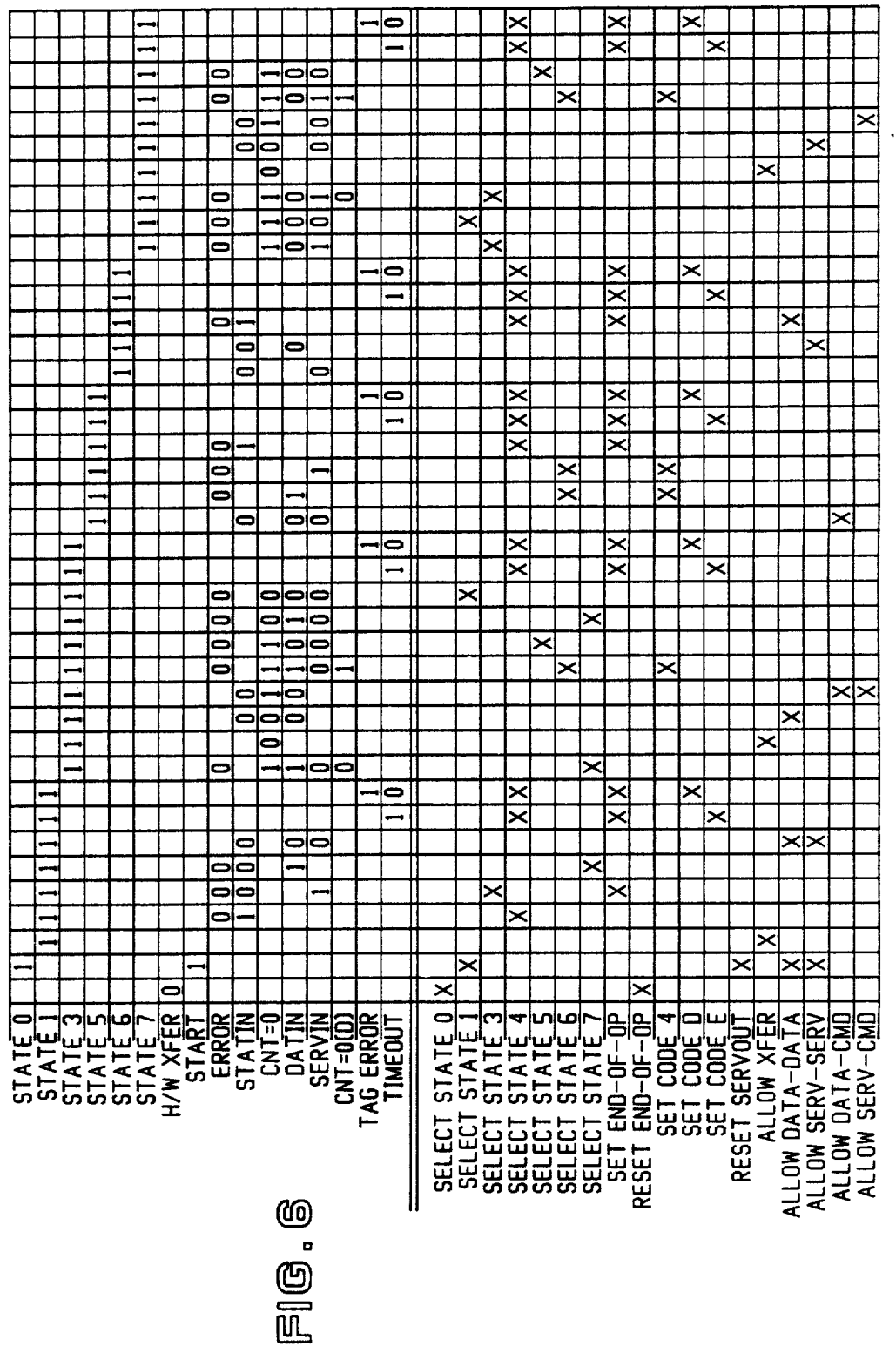
FIG. 6 is a state flow diagram of a sequential state machine for performing the data transfer procedure of the emulator.

FIGS. 4 to 6 are flow diagrams specifying the sequences of the state machines in the controller 18. The input signals are shown above the double line and the actions associated with the combinations of inputs is shown below the double line. The sequences always start in the first column. Each column is associated with a particular machine state and one of the actions associated with each column is the selection of the next state.

The conditions above the double line in each column represent input signals to AND gates with the specified variable (1), or its inverse (0), as the input value. The output signals from the AND gates so denoted execute the operations indicated below the double marked with an X.

The actual construction of a state machine is well known in the prior art. One structure comprises a number of flip-flops equal to the number of bits necessary to represent the binary number of the states. In the embodiment being described, three flip-flops are sufficient for each state machine. Combinatorial logic, coupled to the output signals from the flip-flops and to the input condition signals, supply output signals for executing the proper sequence of operations. The same or separate combinatorial logic supplies signals for selecting the next state for the next cycle. (For an example of such a state controlled machine, see U.S. Pat. No. 3,922,587.)

The sequence specified by FIG. 4 is part one of the automatic initial selection procedure. The first column shows that an inverted hardware initial select signal from the processor 10 selects state 0. In the machine of FIG. 4, the final state is state 7. That is, when the state flow sequence reaches state 7, the machine becomes quiescent.

In state 0, if the signal TAGS1 is true (1), then state 1 is selected and the address register (ADR REG) is gated to BUSOUT. If the signal TAGS1 is false (0), then state 5 is selected and no operation is executed.

State 5 selects state 7, the final state, and sets a signal CODE 8 and sets an end-of-operation condition. The end-of-operation signal returns control to the processor 10 for software error recovery and the code 8 signal indicates the reason for termination of the hardware execution.

State 1, selected by the signal TAGS1 true, selects state 3, gates ADR REG to BUSOUT, and sets the ADROUT tag.

State 3 selects state 2 which continues on one of six possible paths, each defined by a unique set of input variables or their inverse The entire sequence of the first machine is specified by FIG. 4. The sequences of FIGS. 4 through 6 can be implemented in software, but preferably in hardware for faster, parallel operations, by one of ordinary skill in the art given the flow diagrams in the figures.

When the sequence of FIG. 4 reaches state 4 and the value on BUSIN is the same as the contents of the address register (ADR REG), as determined by a dedicated comparator, for example, and the parity is proper (1), then the final state 7 is selected and a start signal is provided to the sequential machine of FIG. 5 (START PART 2).

The machine of FIG. 5 was also started by the inverse of the hardware initial selection signal but remains in state 0 until the START PART 2 signal is supplied by the machine of FIG. 4.

As in FIG. 4, the final state is state 7. There is no state 5, however.

When the machine of FIG. 5 reaches state 6 and the TAGS5 signal is true with the STATIN, CMD=0, and the TIMEOUT signals being false, state 7 is selected and a START signal is supplied to the machine of FIG. 6. The other terminations in state 7 set the END-OF-OP signal and a code for the software error recovery routine.

The machine of FIG. 6 controls the transfer of

When the hardware transfer signal, i.e., H/W XFER, is false, the machine of FIG. 6 is started but remains in state 0 until the start signal arrives from the machine of FIG. 5 indicating the initial selection procedure is completed with no errors.

The machine specification of FIG. 6 is clear from the foregoing explanation. One of the output signals is that used in the logic module illustrated in FIG. 2. The ALLOW DATA-DATA is the signal that allows a data in tag to produce a data out tag signal with the accompanying timing as previously described in connection with FIG. 2.

An emulator controlled by one processor to operate as if it were a different processor or controller has been described having hardware-implemented state machines for predicting next events and preactivating logic modules for responding to the predicted next events. The preferred embodiment has been described in terms of an emulator for a S/370 I/O channel but the principles, concepts, and techniques described are not limited thereto and can be practiced and applied in connection with an unlimited number of systems.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A system controlled by driver means for operating device means requiring input signals to cause functions to be executed by the device means, at least one of said functions requiring input signals to be supplied in response to return signals from the device means at a rate exceeding the maximum rate of the driver means, comprising, in combination:
    means in said driver means for supplying control signals indicating that a function requiring input signals at a rate exceeding the maximum rate of the driver means is to be executed;
    control means responsive to the control signals and to the return signals for supplying enabling signals; and
    circuit means responsive to the enabling signals and to the return signals for supplying input signals to the device means.

2. The system according to claim 1 wherein said control means includes
    means responsive to said control signals and to said return signals for determining a selective enabling signal to be selected.

3. The system according to claim 1 wherein said control means includes
    means responsive to said return signals for determining an abnormal condition in said device means not controllable through the circuit means; and
    means coupled to the determining means for supplying a signal to said driver means to cause said driver means to supply input signals to the device means and for removing enabling signals to said circuit means.

4. The combination comprising:
    driver means for supplying signals to control a device means, said device means having means for receiving input signals and supplying return signals;
    controller means responsive to signals from the driver means and to return signals from the device means for supplying control signals indicating that the device means requires input signals at a rate greater than can be supplied by the driver means; and
    circuit means responsive to the control signals and to the return signals for supplying input signals to said device means.

5. The combination according to claim 4 including:
    means in said controller means for detecting an abnormal condition not controllable by said control means; and
    means for returning control to said driver means.

6. The system according to claim 3 including:
    means in said control means responsive to said detecting means for supplying an error signal identifying the abnormal condition; and
    means in said driver means responsive to said error signal for executing corrective procedures to continue proper emulation.

7. A system using a processor means for emulating device driver means for supplying control signals to driven device means to execute functions, at least one function requiring control signals to be supplied in response to return signals from the driven device means at a rate exceeding that of the processor, comprising, in combination:
    means for determining that a certain function of the driven device means to be executed requires control signals at a rate exceeding that of the processor means; and
    control means responsive to said determining means and to said return signals for supplying control signals to the driven device to cause said certain function to be executed.

8. The system according to claim 7 including in said control means:
    means for detecting an abnormal condition not controllable by said control means; and
    means for transferring emulation control to said processor means.

9. The system according to claim 8 including:
    means in said control means responsive to said detecting means for supplying an error signal identifying the abnormal condition; and
    means in said processor means responsive to said error signal for executing corrective procedures to continue proper emulation.

* * * * *